June 11, 1935.  E. E. KENT  2,004,118
WELTING AND METHOD OF PRODUCING WELTING
Filed May 29, 1933
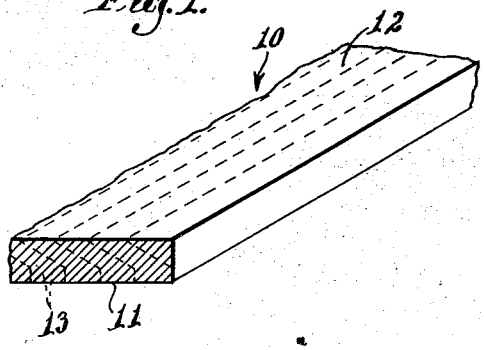
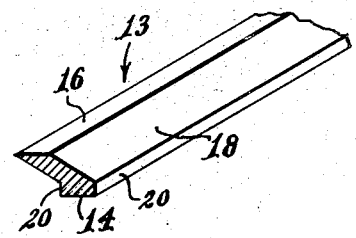
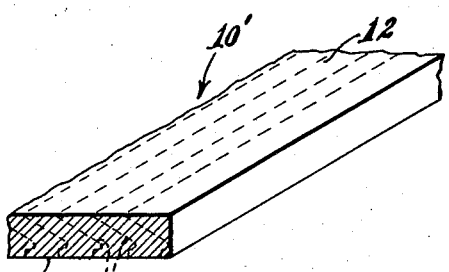
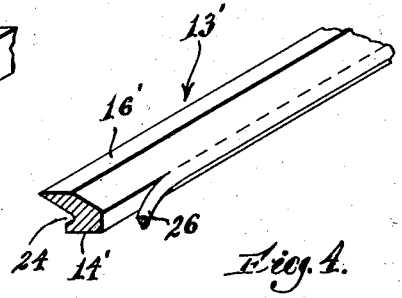
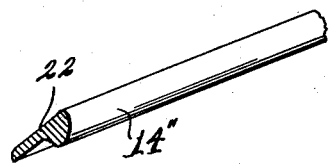
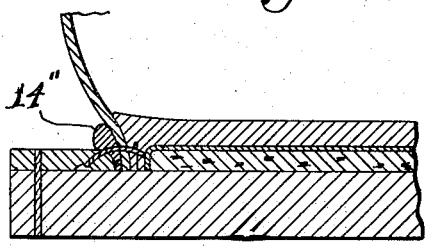
Inventor
Everett E Kent Patented June 11, 1935

2,004,118

UNITED STATES PATENT OFFICE 2,004,118

WELTING AND METHOD OF PRODUCING WELTING

Everett E. Kent, Newton, Mass., assignor to V. & F. W. Filoon Company, Brockton, Mass., a corporation of Massachusetts Application May 29, 1933, Serial No. 673,336

8 Claims. (Cl. 12—146)

This invention relates to improvements in welting and methods of producing welting. More especially it relates to calk welting as a beaded strip of leather, adapted for filling the crease at the juncture of a Goodyear welt with the upper of a shoe, to exclude mud, snow, water and dust, as well as to lend distinction and character to the shoe. However, this same general type of welting may be employed in other connections, as in a McKay shoe, or for finishing the seams in upholstery, for example.

In Goodyear welt shoes the ideal for calk welting is that its bead should plug the welt crease, with the bead surface exposed, and that a fin integral therewith should reach inward between the Goodyear welt and the upper, curving around the inner beveled corner of the Goodyear welt, whence it may reach down across the inner edge thereof to where the Goodyear welt, the bottom edge of the upper, and the edge portion of the innersole all rest on the top of the outersole. And the calk welting is secured in this place by the usual inseam whose stitches hold it, the Goodyear welt, the upper and the innersole together.

The primary aim in the production of calk welting in general is to provide, at a commercially practicable cost, a welting having a bead capable of serving its calking function effectively throughout the life of a shoe, with its exposed surface adapted to be smooth, polished and attractive, and adapted to be so maintained; and having a welting fin, integral with the bead, with the necessary extent backward from the bead. To these ends it is desirable to form the bead with a surface of grain leather, but this is the more expensive part of a strip of leather, and the fin, which is to become hidden in a shoe, does not need to be of grain leather. But the fin does need to be longer than the usual thickness of a piece of leather from its grain face to its flesh face. Therefore calk welting heretofore on the market has usually been a strip cut in some one of various ways parallel to the face of the original leather, in order to get the necessary dimension. A proposal has been made to cut and mold a rectangular stock strip of leather into a beaded welting by cutting away certain cross-sectional portions of the strip substance. Such a method is shown in the patent of George Hollis Jennings, No. 1,911,956, of May 30, 1933 and the present invention is adapted for use in making one species of the generic invention there claimed.

It is an object of the invention to eliminate some steps which are involved when the species there claimed is practiced.

Another object is to eliminate a very considerable part of the waste of leather which heretofore has been incident to the preparation of a calk welting strip.

It is also a feature that strips may be quickly cut and made ready for molding, somewhat on principles of mass production, and put through their molding with less of the time consumption which adds to the production cost.

According to the invention the initial cutting of a strip from the hide or other piece of leather is accomplished in such a manner that the strip as initially cut has a shape capable of being molded directly, without further trimming or skiving. Or it may approximate a desired preliminary shape, requiring a simple skiving off of excess. A multiplicity of the strips may be cut simultaneously from a hide by a gang of cutters, without appreciable wastage of leather, either at the cutting or afterward in the individual strips. And the cutting may be spiral to produce long strips without splicing.

It is intended that the patent shall cover, by suitable expression in the appended claims, whatever features of patentable novelty exist in the invention disclosed.

In the accompanying drawing:

Figure 1 is an isometric showing of a fragment sheet of leather from which multiple strips may be cut according to the invention, as represented by the dotted lines;

Figure 2 is an isometric showing of a strip produced according to my improved method;

Figure 3 is a view similar to Figure 1 with a modified form of strips shown by the dotted lines;

Figure 4 is an isometric showing of the modified form of strip represented by the dotted lines in Figure 3;

Figure 5 is an isometric showing of a finished welting attainable by molding either of the strips of Figures 2 or 4; and Figure 6 is an elevation in section illustrating the welting of Figure 5 embodied in a shoe.

Referring to the drawing, each of the represented pieces of leather 10, 10' of Figures 1 and 3 may have a grain face 11, and a flesh face 12, of which the grain face leather is suitable for surfacing the welting bead which is to be exposed in a shoe; and the mid-substance and flesh face substance, which underlie the grain leather and comprise the main body of the sheet, are suitable for use in the fin which reaches into the welt crease in a shoe, to be there stitched by the customary inseam.

But production of calk welting for use in shoes requires an over-all dimension of welt, from grain face to tip of fin, greater than is found in the thickness of ordinary leather. Leather is not truly plastic, in the sense that like clay or rubber it is susceptible of being transformed from one shape, such as a rectangular strip, for example, to another radically different shape, such as that of a calk welting, by mere confinement and application of pressure. The fibrous structure of leather is one of the reasons which prevent this.

But the invention provides a strip structure and shape capable of being molded directly to welting form. Figure 1 of the drawing illustrates one form in which strips 13 may be cut singly or collectively, from a piece of leather, according to my improved method; and Figure 2 shows one such strip 13 ready to be molded as by being run through spreading, shaping and compressing rollers. Strip 13 has a grain face 14, and a flesh face 16 which is off-set laterally with respect to the grain face. Between the off-set but parallel grain and flesh faces, the edges of the strip run in obliquity to those faces as at 18, 19, both edges inclining in parallelism, and, in this instance, each having a perpendicular portion 20 adjacent to the grain face. Such a strip roughly approximates the final shape of a calk welt, and may be transformed into that final welt shape by properly directed molding and transforming pressure. That leather substance which is adjacent to the grain face 14 may be condensed into the welting bead; and the remainder of the strip may be condensed into a fin integral therewith, which may extend from the grain face a distance dimensionally considerably greater than the original thickness of leather in piece 10, as may be seen by the welting represented at 22 in Figure 5.

The prepared strip 13' of Figure 4 has a groove 24 in the edge which dips under the grain face 14'. This groove facilitates the bending, shaping and spreading of the strip by the molding rollers. But, at the opposite edge an excess bead 26 is present on strip 13' as initially cut, which may in some instances be utilized as a part of the bead, or, if otherwise, requiring a skiving step to eliminate it prior to the molding.

Other strip shapes suitable for molding into calk welting may be attained in the single act of cutting leather into strips. And, if desired, further steps of skiving or chamfering portions of the strips 13, 13' may be performed, although not necessary.

The molding of a strip 13 or 13' ordinarily will be accomplished by running the strip, after being duly tempered, between rolls suitably shaped and associated to apply to it the molding pressure. The preliminary tempering and softening may include treatment with a solution of resinous material, as shellac, or with casein, or some other material that after drying and hardening will help hold the leather in its new form. Thus treated, the leather substance going into the fin may be compacted so as to materially reduce its thickness; and the molding pressure applied to the softened material can also extend it appreciably, to an increased depth, for reaching from the bead into the welt crease of a shoe and being firmly secured by the inseam.

The welt produced by the invention may in some cases be used without the further shaping by the molding step. In particular, the initial cutting in the shape of Figs. 3 and 4, or a shape resembling that and without removal of the ridge 26, may be substituted for the shape of Fig. 5 in shoe construction.

Referring to Fig. 6 for an example of an application of this in combination with a Goodyear welt, the groove 24 might lie around the upper inner corner of the Goodyear welt, to permit a close fit of the bead on the top of the Goodyear welt; and the ridge 26 left intact and not removed as indicated in Fig. 4, would reach up to make a graceful curved approach of the top edge of the bead to the upper; having also the result of broadening the calking effect of the bead to a dimension greater than that of its mere grain face. The proximity of this ridge to the upper need not always be an actual contact, as this region is not much exposed to view, in some shoes, owing to overhang of the upper; and the fact that the ridge of the bead is seen approaching the upper on a curve indicates to the eye that a contact therewith is made just beyond.

I claim as my invention:

1. The method of producing a welting strip having a bead and a fin, comprising the cutting, from a piece of leather, of a strip having two parallel faces in off-set relation to each other and having side edges of which portions extend obliquely in approximate parallelism; followed by the compressive molding of substance of the leather at one said face into shape for the welting bead; and of substance at the other face, and the between-substance, into shape for the welting fin.

2. The method of producing a welting strip having a bead and a fin, comprising the cutting, from a piece of leather having a grain face and a flesh face, of a strip which has parallel fractions of the grain face and of the flesh face off-set in relation to each other, with side edges of the strip extending obliquely from face to face in approximate parallelism; followed by the molding of that strip to shape the substance at the grain face into a welting bead, and the substance at the other face, and the between-substance, into a welting fin.

3. The method of producing a welting strip having a bead and a fin, comprising the cutting, from a piece of leather having a grain face and a flesh face, of a strip which has a grain face and a flesh face, and in which the two said faces of the strip stand in off-set relation to each other, with side edges extending from face to face obliquely in approximate parallelism, and with one of said edges having a longitudinal groove, and the other having a longitudinal bead; the skiving of the said edge bead; the bending of the strip open at said groove; and the molding of the leather substance at the grain face into the welting bead, and of the material at the flesh face, and the between substance, into the welting fin.

4. The method of producing a welting having a bead and a fin, comprising the cutting, from a piece of leather having a grain face and a flesh face, of a strip whose faces are parts of said grain and flesh faces, and which has its said faces off-set relative to each other so that the length dimension of leather, between centers of said faces, is greater than the thickness of the said leather in the original piece; followed by the molding of that strip into a welting wherein the substance at the grain face constitutes the bead, and the substance at the flesh face, and the between substance, constitute a fin, the whole dimension of bead plus fin being longer than the original thickness of leather.

5. The method of producing a welting strip having a bead and a fin, comprising the cutting of a strip from a piece of leather and, simultaneously with said cutting, grooving said strip along the cut edge; the bending of the strip open at said groove by applying spreading pressure to the strip; and the setting of the strip in welting form, by said pressure; leather substance which was at one face of the strip being thus formed into the said bead, and leather substance which was at the other face of the strip, and substance which constituted between substance, being thus formed into the said fin.

6. In the production of welting strips, the method of producing in multiple a product roughly approximating welting form, comprising the cutting of a group of contiguous strips from a single piece of leather simultaneously, the said cutting being on a curved line making a groove in one edge of each strip, whereby a ridge is simultaneously made in the complementary edge of the adjacent strip of the group.

7. A step product, comprising a blank for making a leather welting strip having a bead and a fin, in which blank the material for the bead has grain surface of a hide of leather; and the material for the fin is leather substance integral with said bead-material and extending thence, obliquely with respect to that grain surface, to a flesh face which is a part of the flesh face of the same hide.

8. A leather welting strip comprising a fin carrying a bead which, in direction transverse to the fin, is thicker than the fin, and has a curved face layer of grain leather extending in said direction; in which welting strip the whole of the leather material is integral and has a body which is continuous between all points which adjoin each other in any cross-sectional direction, being free from cleft and free from flap; and is characterized by this, that in cross-section the angular relation of the axis of the fin to the chord of the curved grain surface is oblique and is approximately the angular relation which that section of stock which composes the fin naturally bears to that layer of grain stock which composes the face portion of the bead.

EVERETT E. KENT.